United States Patent [19]
Morand

[11] Patent Number: 5,815,110
[45] Date of Patent: Sep. 29, 1998

[54] JAMMING METHOD

[75] Inventor: Jean-François Morand, Saint-Cloud, France

[73] Assignee: Electronique Serge Dassault, Saint-Cloud, France

[21] Appl. No.: 228,332

[22] Filed: Jul. 25, 1988

[30] Foreign Application Priority Data

Jul. 24, 1987 [FR] France .................................. 87 10591

[51] Int. Cl.⁶ ........................................................ G01S 7/38
[52] U.S. Cl. ........................................... 342/14; 342/188
[58] Field of Search .............................. 342/14, 15, 361, 342/188; 455/1

[56] References Cited

U.S. PATENT DOCUMENTS 3,473,126  10/1969  Guenard ...................................... 455/1

OTHER PUBLICATIONS

Ferris, J.E. *"Study of Polarization Modulation Techniques-"* Feb. 61, (selected pp. 4,5,6,9,17–20, 40–43, 51,53 and 54).

Primary Examiner—Gilberto Barrón, Jr.
Attorney, Agent, or Firm—Nixon & Vanderhye P.C.

[57] ABSTRACT

The invention concerns the radars jamming able to coherent side looking cancellation. From a jamming source (SBR), it is created two channels supplying respectively transmission amplifiers (AE1 and AE2) followed by antennas (AP1 and AP2) operating in different polarizations. The former at least of the two channels is subject to fast time variations with respect to the latter, for example with a line of programmable length (LLP).

13 Claims, 1 Drawing Sheet

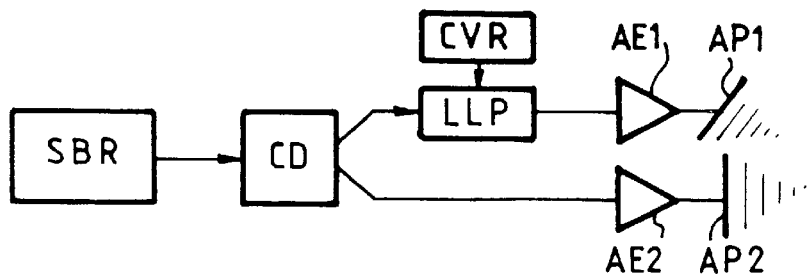
FIG.1
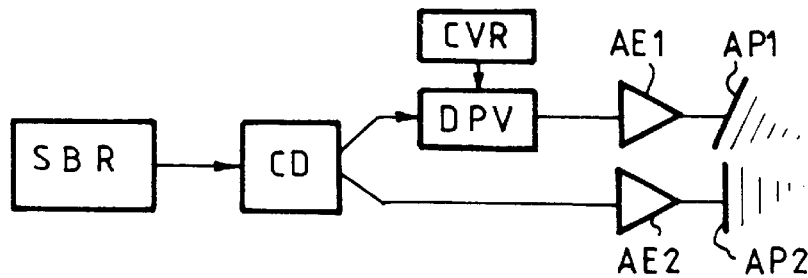
FIG.2
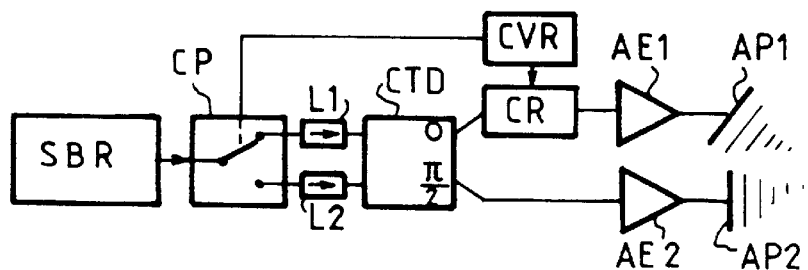
FIG.3
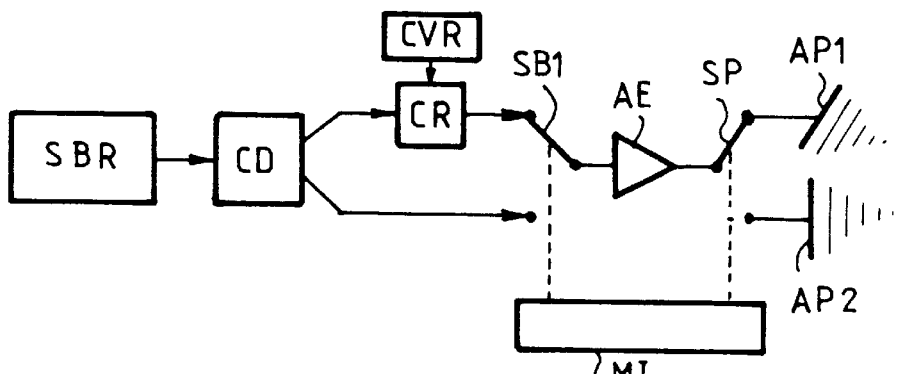
FIG.4
FIG.5
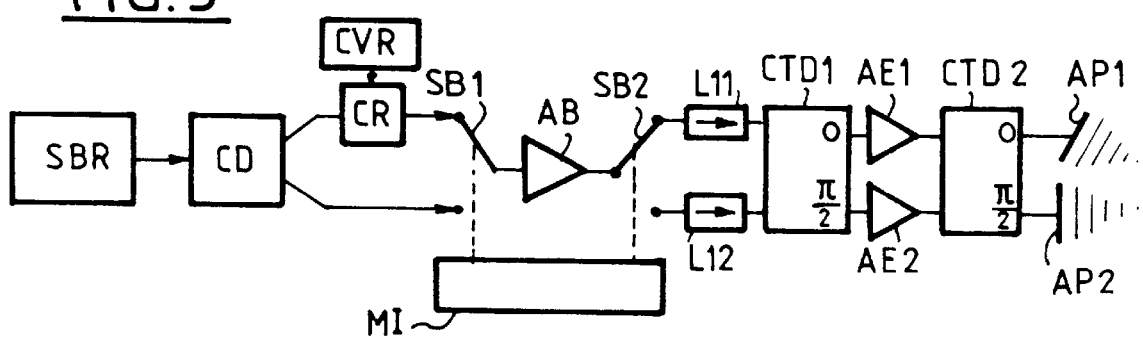

JAMMING METHOD

BACKGROUND OF THE INVENTION

The invention concerns the jamming of electromagnetic detectors, in particular of radars.

The deployment of such jammings is termed a "counter-measure". The radar is responding thereto by "counter-counter-measures". Those may comprise the provision of "holes" in the reception pattern of the radar-antenna, as disclosed for example in the Applicant's French Patent Application No 83 16653.

But advanced jammings now enter the secondary lobes of the radar antenna.

The appropriated counter-counter-measure is termed "Coherent Side Looking Cancellation". It comprises the use of an auxiliary antenna at the level of the radar. The radiation collected by this auxiliary antenna is used, after processing, to cancel undesirable response of the radar antenna secondary lobes. This constitutes a kind of neutrodyning, that comprises a feedback or servo-control between the auxiliary antenna and the main radar-antenna.

SUMMARY OF THE INVENTION

The purpose of the present invention is to elude such counter-counter-measures.

The invention is firstly based on the remark that said feedback or servo-control reacts with a certain delay which may be defined by a time constant.

The invention is also based on the remark that an aerial has not only normal secondary lobes, but also "diffused" secondary lobes due to backward diffusion of elements close to the antenna, and that the responses due to normal secondary lobes and particularly to these "diffused" secondary lobes are very different from the response of the main lobe, in terms of gain as a function of polarization incident signal.

The invention is further based on the remark that the ability of a radar to perform counter-counter-measures is necessarily limited, in terms of number of processed jammers, and/or of processing capacity devoted to this function.

Thus, one of the basic concepts of the invention consists in creating, at the level of the radar aerial, an electromagnetic field the polarization of which is made variable with a periodicity lower than or equal to the response time of the above cited feedback or servo-control.

The two components (of polarization) of the electromagnetic field are not independent, but show a certain correlation, during a time comparable to the response time of the servo-controls. Consequently, it is not possible to discriminate them as being two independent jammings.

Thus, the invention proposes at first a method for jamming electromagnetic detectors, in particular radars, characterized by transmitting at least two jamming electromagnetic signals or channels having different polarizations, and being subject to fast time variations with respect to each other.

Very advantageously, the two signals are originated from the same jamming source. One of the two signals undergoes then a time-shift or a phase shift variable with the time. It is very interesting that this variation with the time would be faster than the estimated time constant or response time of the servo-controls used by the detectors or the radars for cancelling or discriminating the jammers.

When the method is applied against Doppler or pulse-Doppler radars, the jamming transmission may be accomplished in the pulse form, in particular in alternating the two signals, while of course preserving a periodicity lower than the integration time of the radar Doppler filters.

The invention offers also a jamming device including a jamming electric signal source such a noise source with a selected band width, and means for amplifying and transmitting a jamming electromagnetic signal from this source.

According to the invention, the transmission means include two antennas operating according different polarizations, and the amplification means include two paths or channels for supplying these two antennas. At least, one of the paths includes a means for applying a variable temporal modification to the jamming electric signal.

This temporal modification means may be a line of programmable length. In this case, said variable temporal modification consists in a variable temporal displacement between the signals of the two channels.

The temporal modification means may also include a variable phase shifter. It is obtained then a variable phase shift between the two channels.

It is possible to combinate the two solutions.

The temporal variation may be controlled by a variation circuit, in particular random, which then controls the phase shifter and/or the line of programmable length.

In a preferred embodiment, the amplification means include, at least at their input, a controlled inverter switch, followed by a phase shifter-coupler (also termed "3 decibels coupler"). A such coupler may bring the signal of one of its inputs (at choice) on the one hand without phase shift to one of its outputs, on the other hand with a phase shift of 90° to the other output. The inverter permits to vary the considered input at a fast rate, completing thus the effects yet obtained according to the invention.

In the case of Doppler or pulse-Doppler radar inverter switches operating at a selected rate could be provided in order that the device according the invention could provide a pulse transmission, preferably alternating the two channels, at a rate higher than integration time of the radar Doppler filters.

In this case, the latter of the switches could be followed by at least a phase shifter-coupler, agenced as previously.

BRIEF DESCRIPTION OF THE DRAWINGS

Other characteristics, features and advantages of the invention appear in the following detailed description and the attached drawings, in which:

FIG. 1 illustrates a first embodiment according to the invention;

FIG. 2 illustrates an alternative embodiment according to the invention;

FIG. 3 illustrates an other alternative embodiment according to the invention;

FIG. 4 illustrates a device version according to the invention envisaged against Doppler radars; and FIG. 5 illustrates an alternative embodiment of the device envisaged according to the invention against Doppler radars.

DESCRIPTION OF THE INVENTION

The appended drawings are incorporated into the description, not only to enable a better understanding of this description, but also to contribute to the definition of the invention, if necessary.

On the drawings, the reference SBR designates a source of a jamming electric signal.

The references AP1 and AP2 designate two antennas operating according different polarizations.

In a first case, the antenna AP1 may be a horizontal polarization antenna whereas the antenna AP2 is a vertical polarization antenna. These two antennas may have also two crossed oblique polarizations. The former still may have a right circular polarization and the other may have a left circular polarization.

The antennas used may be simple antennas, or two independent array antennas transmitting according crossed polarizations, with the same variants as previously.

Men skilled in the art shall understand that it is not necessary to have antennas of which the phase center are superposed. When the phase centers are distinct, this results into a supplementary phase variation which produces a supplemental shift, adding to the delay or the variable phase shift that it is imposed according to the invention thereto, between the two polarizations of the jamming signal.

In FIGS. 1 and 2, the output of the element SBR is fed to a distributor-coupler CD, Which have two output paths. The former output is connected to a transmitting amplifier AE1 feeding the antenna AP1 via a line of programmable length (LLP, FIG. 1) or of a variable phase shifter (DPV, FIG. 2). The latter of the outputs may be connected directly to the transmitting amplifier AE2 followed by the antenna AP2. But this second output could be also agenced as the former. A circuit control of fast variation CVR secures the control of the line of programmable length or of the phase shifter, as the case may be.

Men skilled in the art shall understand that the jamming electromagnetic signals transmitted by the two antennas AP1 and AP2 are not independent, and therefore may not be considered as coming from two distinct jammers.

On another hand, due to the fact they show different polarizations and relative variations faster than the servo-control response time of the hostile radar counter-counter-measure, and that the auxiliary antenna(s) of this one has (have)not the same response than the normal secondary lobes and particularly the diffused secondary lobes of its main antenna, it will be very difficult or impossible for this radar to eliminate the effects of a such jamming in the signals Which it receives.

FIG. 3 illustrates a variant which renders the radar task yet more difficult.

In this figure, circuit CR may be the line of programmable length LLP of the FIG. 1, or variable phase shifter DPV of the FIG. 2.

Instead of distributor-coupler CD, it is used here a switch CP, of which the two outputs are connected by two unidirectional transmission lines C1 and C2 at the two inputs of a 3 dB coupler CTD. Depending upon whether the former or the latter of the inputs is used, it is obtained a 90° phase jump at level of each two inputs of this coupler.

This 90° phase jump is going to add up at fast variations get by the circuit CR.

The invention effect is also yet reinforced.

This effect may be disclosed more precisely as follows:

To eliminate a normal stationary jammer (different of those of the invention) having a narrow transmission spectrum, one only needs an auxiliary antenna aimed at the direction where this elimination is to be performed.

Even if one uses two auxiliary antennas to try to discriminate the two jamming signals with different polarizations, this does not work because auxiliary antennas see signals which show a certain correlation between them, in a time comparable at the time constant of the servo-controls of the radar counter-measure. The two auxiliary antennas are going therefore in fact to have the impression to process only one jammer.

When the jamming spectrum is wider, the difficulty is yet greater due to the fact the ratio of the two signals transmitted by the jammer according to the invention may be also variable with the frequency, because it is possible to modify the jammer's radiation patterns, or yet to have the polarization changing with the frequency.

It appears therefore that the radar task is seriously complicated, when confronted with a jammer according to the invention.

In the practical situations, a radar will be confronted with several jammers of this type. The presence of several carriers of jammers according to the invention makes rapidly illusive the form of electronic counter-counter-measure of the coherent side looking cancellation type. As a matter of fact, by the way of the pumping risks of the servo-control incorporated into this counter-counter-measure, the implementation of the same may reveal much baneful than useful, and it is precisely the purpose expected by the jamming according to the invention.

An interesting application consists in facilitating the penetration of an air raid. In equipying the raid aircrafts with jammers working against the same radar, one will be obtained rather rapidly a saturation of the processing capacity of such a radar, in terms of the number of independent auxiliary channels each devoted to neutralize a jammer.

Furthermore, the processing systems of the radar will have to face many ambiguities, when it will try to triangulate the jamming sources so defined by the different aircraft carriers of devices according to the invention. If one considers for example three actual jamming sources, those are going to create six ghosts that the radar have to discriminate before enacting its counter-counter-measures. More generally, for n jamming sources according to the invention, the ghosts number is n(n−1). This number increases very rapidly with the used jamming sources.

The devices hereinbefore described work with any type of radar.

When it is desired only to counter Doppler radars or pulse Doppler radars, only one transmitter may be sufficient in the device according to the invention, if it is switched in a time shorter than Doppler filters integration time between antennas with crossed polarization.

Thus, in FIG. 4, it observed that the two transmission amplifiers AE1 and AE2 of the FIG. 1 are replaced by one only amplifier AE, flanked by two inversors SB1 and SP controlled by a pulse modulation circuit MI.

It is used here a power switch SP, which supplies the two antennas AP1 and AP2.

In the variant according FIG. 5, the switching works at low signal level, that is on both sides of a amplifier AB, under the form of two inverters SB1 and SB2.

It is then possible to put after the down stream switch SB2 two unidirectional connections L11 and L12, followed by a 3 dB coupler CTD1. The two outputs in quadrature of this one are fed to two transmission amplifiers AE1 and AE2, followed by a second 3 dB coupler CTD2, of which the two outputs in quadrature supply the antennas AP1 and AP2.

This implementation procurates not only temporal variations bound to the use of circuit CR (which is a line of programmable length LLP and/or a variable phase shifter DPV), but also the interesting effect of brusque phase jump that yet described in reference of FIG. 3.

The Applicant has observed that the devices according to the invention permit an average gain of a tenth of decibels in the efficiency of jamming penetrating outside of principal lobe of radar aerial. That is from that, generally, the patterns according to the two crossed polarizations are substantially complementary of one another in the secondary lobes and the diffused.

I claim:

1. A method for jamming radar, said radar having an estimated response time to jammer cancellations, comprising the steps of:

transmitting at least two jamming electromagnetic signals, each signal having different polarizations and being subject to fast time variations with respect to each other signal, said signals originating from the same jamming source;

providing one of said two signals with at least one of a time shift and a variable phase shift with time, wherein said providing step time shift and phase shift is faster than the radars estimated response time to jammers cancellation.

2. A method for jamming Doppler radar, said radar having an estimated response time to jammer cancellation, said radar having Doppler filters, said method including the steps of:

transmitting at least two jamming electromagnetic signals, each signal having different polarizations and being subject to fast time variations with respect to said other signal wherein said jamming transmission is pulsed with a periodicity lower than the integration time of the radar Doppler filters.

3. A jamming device, said jamming device comprising:

a jamming electric signal source, said source having a selected band width;

means for amplifying a jamming electromagnetic signal; and means for transmitting a jamming electromagnetic signal from said amplifying means, said means for transmitting including two antennas operating with different polarizations, said means for amplifying including two channels for supplying said two antennas, at least one of said channels further including a means for applying variable temporal modification to a jamming electric signal applied to said at least one channel, wherein said means for applying temporal modification comprises a line of programmable length.

4. A jamming device, said jamming device comprising:

a jamming electric signal source, said source having a selected band width;

means for amplifying a jamming electromagnetic signal; and means for transmitting a jamming electromagnetic signal from said amplifying means, said means for transmitting including two antennas operating with different polarizations, said means for amplifying including two channels for supplying said two antennas, at least one of said channels further including a means for applying variable temporal modification to a jamming electric signal applied to said at least one channel, wherein said temporal variation is controlled by a random variation circuit.

5. A jamming device, said jamming device comprising:

a jamming electric signal source, said source having a selected band width;

means for amplifying a jamming electromagnetic signal; and means for transmitting a jamming electromagnetic signal from said amplifying means, said means for transmitting including two antennas operating with different polarizations, said means for amplifying including two channels for supplying said two antennas, at least one of said channels further including a means for applying variable temporal modification to a jamming electric signal applied to said at least one channel, wherein said means for amplifying includes, at an input, an inverter followed by a phase shifter-coupler.

6. A jamming device, said jamming device comprising:

a jamming electric signal source, said source having a selected band width;

means for amplifying a jamming electromagnetic signal; and means for transmitting a jamming electromagnetic signal from said amplifying means, said means for transmitting including two antennas operating with different polarizations, said means for amplifying including two channels for supplying said two antennas, at least one of said channels further including a means for applying variable temporal modification to a jamming electric signal applied to said at least one channel, wherein said means for amplifying includes inverter switches operating at a selected rate.

7. A radar jamming method, for radars using servo-control means for cancelling or discriminating jammers, said radar having an estimated response time, said method comprising the steps of:

transmitting at least two jamming electromagnetic signals having different polarizations, and originating from the same jamming source; and shifting at least one of the two signals in one of time and phase, said shifting occurring faster than said estimated response time.

8. Method according to claim 7, wherein said radar is a pulsed Doppler radar having a Doppler filter with an integration time and said transmitting step including the step of pulsing said jamming transmission so as to alternate between said two signals, with a periodicity lower than said integration time.

9. A jamming device for radars, said device comprising:

a jamming electric signal source, such a signal source providing a signal having a selected band width;

means for transmitting a jamming electromagnetic signal, said means for transmitting including two antennas operating with different polarizations; and means, responsive to said source, for amplifying said electric signal and including two channels for supplying said two antennas, at least one of said channels including a means for applying variable temporal modification to said jamming electric signal, wherein said temporal variation is controlled by a random variation circuit.

10. Device according to claim 9, wherein said means for amplifying includes, at an input, an inverter followed by a phase shifter-coupler.

11. Device according to claim 9, wherein said radar is a Doppler radar having a Doppler filter with an integration time, said means for amplifying includes at least two inverter switches operating at a selected rate with respect to said integration time.

12. Device according to claim 11, wherein one of said two inverter switches is followed by at least a phase shifter-coupler.

13. Device according to claim 9, wherein said means for applying variable temporal modification comprises a line of programmable length.

* * * * *